Sept. 16, 1969
R. PYZEL
3,467,738
METHOD OF MAKING A REFRACTORY GRID FOR
A FLUIDIZED SOLIDS REACTOR
Filed July 12, 1966
2 Sheets-Sheet 1
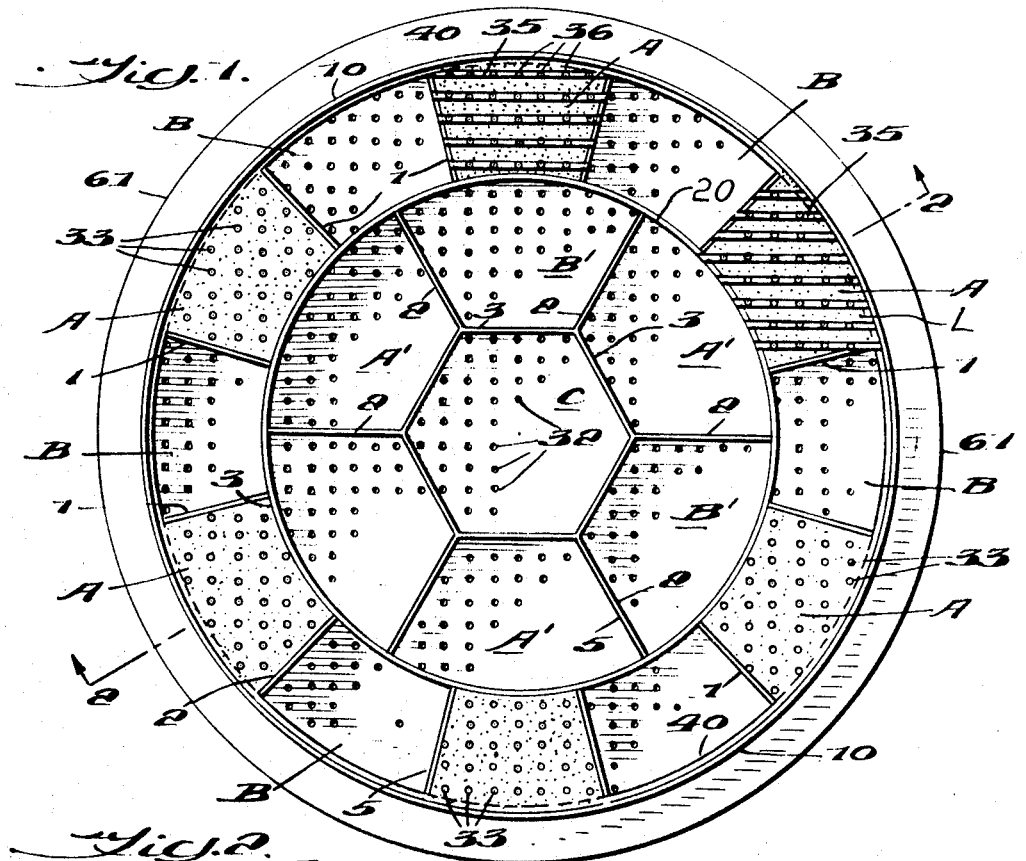
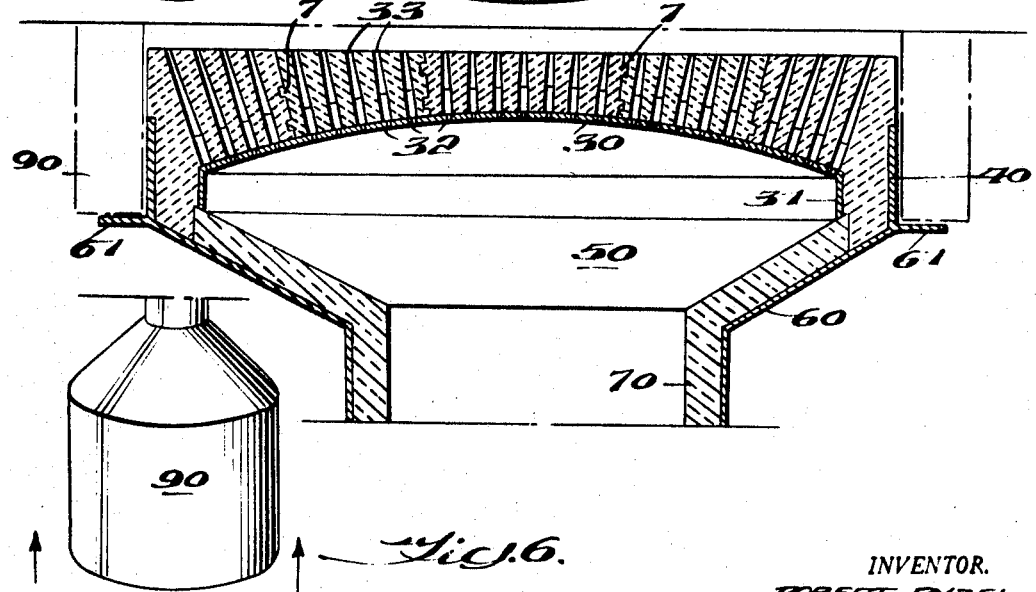
INVENTOR.
ROBERT PYZEL,
BY Pennie Edmonds
Morton Taylor and Adams
ATTORNEYS

United States Patent Office 3,467,738
Patented Sept. 16, 1969

3,467,738
METHOD OF MAKING A REFRACTORY GRID FOR A FLUIDIZED SOLIDS REACTOR
Robert Pyzel, 82 E. End Ave., New York, N.Y. 10028
Filed July 12, 1966, Ser. No. 564,670
Int. Cl. B29c 1/00
U.S. Cl. 264—30                6 Claims

ABSTRACT OF THE DISCLOSURE

A method of forming a large diameter monolithic refractory grid with air passages through the grid for use as the floor of a fluidized solids reactor which includes dividing a casting form into a plurality of sections, positioning combustible dowel pins in the form and casting a quick setting high temperature castable material into alternate sections of the form, allowing the alternate cast sections to harden, and then casting the adjacent sections, and thereafter heating the cast grid to a temperature sufficient to burn out the combustible dowel pins.

---

This invention relates to an improved refractory grid for forming the floor of a fluidized solids reactor and to the method of constructing same.

In the normal arrangement of such a reactor, an enclosed treatment chamber is separated by a horizontally disposed grid floor from a plenum chamber disposed therebeneath. The grid floor has a plurality of holes therethrough providing communication between the treatment chamber and the plenum chamber.

Material to be treated is fed in to the treatment chamber and deposited over the upper surface of the grid floor. Means are provided for introducing heat into the deposited material. Air or gas under pressure is supplied from the plenum chamber through the holes in the grid floor to fluidize the material thereabove.

Fluidized solids reactors of the type referred to herein are used for carrying out reactions in a mass of fluidized particles requiring high heat generation within the fluidized mass at temperatures so high as to preclude the use of metal parts in contact with the fluidized mass. Although not so limited in utility, it is customary to employ these reactors in large diameters for carrying out reactions in a fluidized mass of such depth in relation to the reactor diameter that a high aeration rate is required and horizontal dispersion of heat and air due to turbulence in the mass may not necessarily be reliable to effect the necessary intermingling of fuel and air within the mass. The design and construction of the grid floor, therefore, is a very important feature of such a reactor because proper spacing of the air holes in the grid floor is essential to avoid short circuiting of the air and to insure proper dispersion of the air to effect the necessary fluidization and heating of the mass.

In the past, refractory grid floors of this general type have been constructed using a plurality of tapered bricks, however, this type construction made it practically impossible to provide the many properly spaced holes which are essential for proper operation of the reactor. Furthermore, this type of construction required extensive form work to support the bricks during installation and is therefore very expensive.

Another prior method of constructing the grid was to cast it in a mold as an integral mass; however, the high temperature castable materials which were available were of mixed composition, and when placed into the form and properly worked before setting, showed considerable variation in chemistry, strength-development and thermal-expansion characteristics of the thermally set material in the finished casting. Unpermissible stresses would manifest themselves in the finished casting when raised from atmospheric temperature to temperature above 2000° F. Severe cracking and a general breakdown of the grid so fabricated was to be expected.

Several important features of the grid floor of the present invention make it possible to construct the grid in large diameters incorporating features that enable the fuel and fluidizing air to be properly dispersed throughout the mass thus effecting maximum heat liberation within the mass, together with high reactor output and fuel efficiency.

The grid floor is basically of refractory construction to withstand extremely high temperatures. The grid is cast in a mold and is perforated with a very large number of holes. Some of the holes may be used for the fuel and feed injection pipes. The air holes that are used for introducing fluidizing air are tapered from the top to the bottom of the grid thus preventing clogging.

The refractory grid of this invention and its associated plenum assembly therebeneath are constructed as separate units from the treatment chamber. The grid-plenum assembly is originally cast below the treatment chamber and, when completed, it is hoisted or jacked into position. One advantage of this type installation is that the grid-plenum assembly may be subsequently lowered for major repairs or replacement. Another advantage is that it avoids preparation of the castable mix outside the reactor and subsequently hoisting the mix and lowering it into the treatment chamber for casting.

Successful casting of the grid in a mold is made possible through the use of a newly developed high temperature castable material which consists entirely of alumina with an alumina cement binding agent. The final, thermally-set casting produced with this castable is chemically uniform throughout; shows an extremely high strength, and is characterized by a low thermal expansion. The mass weight of the material is sufficient to resist the upward air pressure thus eliminating cracking.

A problem encountered with the castable, the solution of which forms one important feature of this invention, is that the castable material sets in approximately twenty minutes, which is insufficient time to cast and work the material when making a large diameter grid floor in a single pour. Not only is the setting time extremely short, but, in order to properly compact the castable material when placed in the forms, it is essential to use electrically or pneumatically driven vibrators. Stirring the mix by hand is very difficult, since the castable must be placed in the form as a dry mix, containing comparatively little water.

To overcome the casting problem, the treatment chamber is installed in its ultimate position, and a form corresponding to the outside dimension of the grid is then placed on top of the plenum chamber which rests on the foundation underneath the treatment chamber. This procedure avoids having to prepare the castable mix outside the reactor and then hoist and lower the mix, a bucket at a time, into the reactor to fill the grid form. Crucial minutes are saved by the ready accessibility of the grid form on the foundation beneath the treatment chamber.

The form is subdivided into a plurality of sections by the use of inner form rings and radial partition members. The castable material is then poured into one section at a time and properly compacted. This procedure is continued as alternate sections are cast and compacted. Once these alternate sections are set up (approximately twelve hours) the form partition members are removed and the intermediate sections are then cast and compacted directly against the previously cast and already hardened material. The grid-plenum assembly is then jacked into position on the underneath side of the treatment chamber and secured thereto.

The holes through the grid are provided by arranging suitable dowels in the form at the desired locations prior to pouring the castable material. The material for the dowels must be such that it will burn or melt at some desired temperature thus leaving clean holes through the grid.

A better understanding of the invention may be had from the accompanying drawings in which:

FIGURE 1 is a plan view showing the refractory grid form and illustrating the arrangement of the form partition members, with alternate sections A of the grid filled with refractory material, and with two of the sections A having the top of the dowels still held in place by connecting strips;

FIGURE 2 is a cross-sectional view taken along line 2—2 of FIGURE 1 but with the interior form members removed and all of the casting being completed and showing the relationship of the grid with its plenum chamber ready to be secured to the treatment chamber;

Figure 3:
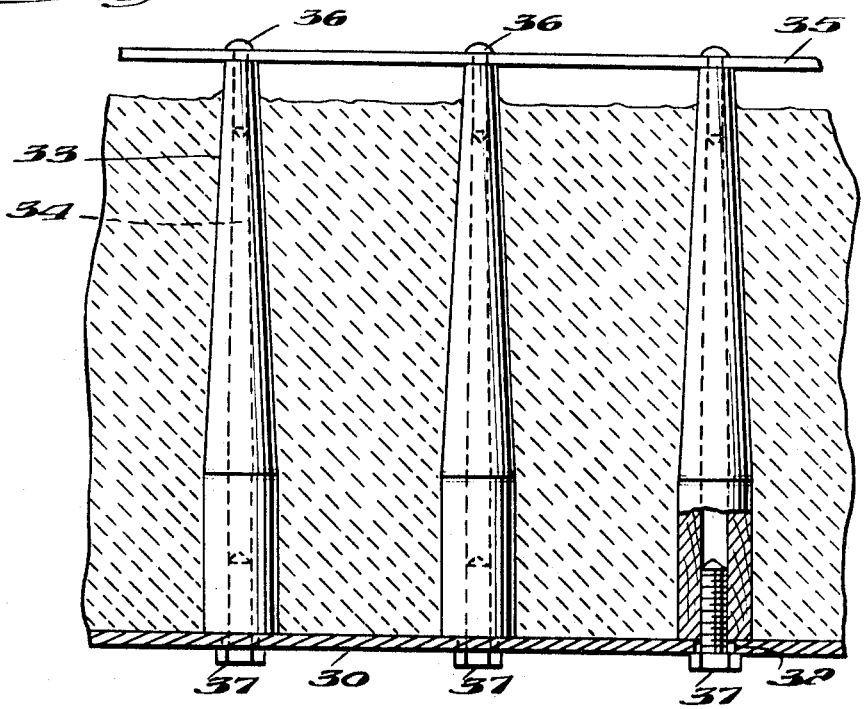
Figure 4:
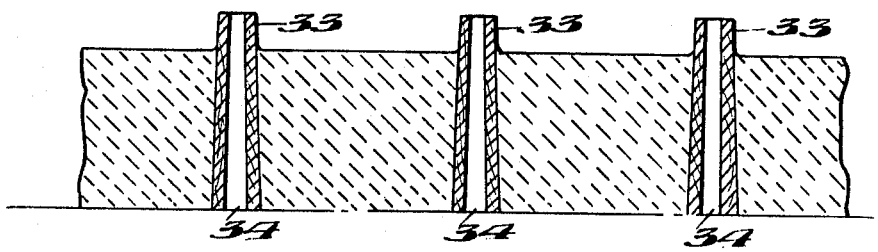
Figure 5:
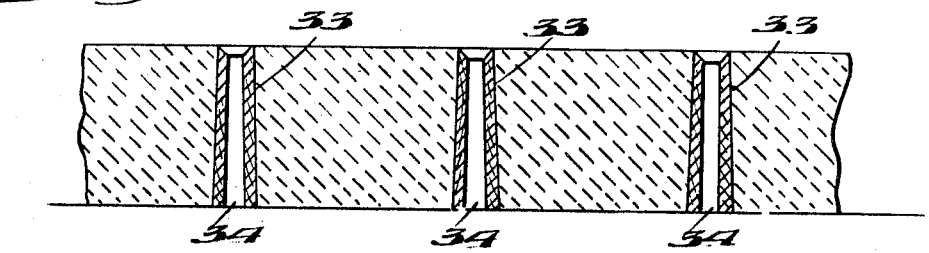

FGIURE 3 is a sectional view similar to FIGURE 2, on an enlarged scale, of a segment of the grid and illustrating the dowel connecting strips;

FIGURE 4 illustrates the top of the segment of FIGURE 3 with the connecting strips removed;

FIGURE 5 illustrates the segment of FIGURE 4 in its finished form with the ends of the dowels ground off and countersunk;

FIGURE 6 is a semi-schematic representation of a finished grid-plenum assembly positioned underneath and in alignment with its treatment chamber just prior to final assembly.

The construction of the grid-plenum assembly 100 can best be followed in FIGURE 2 wherein the outside shell 60 for the plenum chamber 50 is placed in position underneath a treatment chamber 90 and an insulating castable 70 is placed along the inside walls of the plenum chamber shell. After the insulating castable sets, the bottom form 30 of the grid is placed in position with vertical flanges 31 resting on the insulating castable. This bottom form 30 may consist of a steel plate suitably curved and provided with a plurality of properly spaced small holes 32 for the attachment of the dowels 33 in the manner shown in FIGURE 3.

A permanent grid retaining ring 40 is placed in position and connected to the plenum chamber outside shell 60 as by welding. A concentric connecting flange 61 is fastened to the grid-plenum assembly at the juncture of the plenum outside shell 60 and the permanent grid retaining ring 40 as by welding. Connecting flange 61 is used to connect the grid-plenum assembly to the treatment chamber 90.

A removable outer form ring 10 which forms an upward extension of the permanent grid retaining ring 40 is placed in position and removably connected around the upper outside edge of the grid retaining ring 40. Inner form ring 20 is likewise placed in position on the upper surface of the bottom form 30 and radial partition members 1 are installed between rings 10, 40 and ring 20 in the positions shown in FIGURE 1 thus dividing the space between the rings into a plurality of consecutively alternating form sections A, B, A, etc. The inner form ring 20 and the radial partition members 1 may have horizontal strips 5 secured thereto which create grooves 7 in the cast grid sections that later receive material from a subsequently cast adjacent section thus causing a dovetailing together of the sections when they are cast against one another in the manner described hereinafter.

Dowels 33 are employed to provide air holes in the refractory grid to provide for passage of air or gas into the treatment chamber. The dowels are made of wood or other material which will either burn or melt when heat is applied. The dowels are preferably tapered with the large end toward the bottom of the grid thus providing a tapered hole in the grid when the dowels are removed which makes the holes non-clogging since material which falls into the holes from above will easily fall through the progressively enlarging hole. The dowels have a central hole 34 extending therethrough to permit preheated air to pass upwardly therethrough and thus facilitate burning or melting of the dowels and aid in drying of the cast refractory. Additional dowels, not shown, may be provided where required for feed and fuel line openings into the treatment chamber and are placed in the same manner as the air hole dowels.

As is best illustrated in FIGURE 3, the dowels are properly positioned and connected to the bottom form 30 by the use of wood screws 37 which pass through the holes 32 in the bottom form and into central hole 34 of the dowels. Since the position of the holes 32 in the bottom form 30 determines the location of the dowels and subsequently the air holes, the holes 32 must be properly spaced to insure proper dispersion of the air to effect the necessary fluidization and heating of the material mass to be treated. The length of each dowel is such as to project approximately one half inch beyond the upper surface of the cast grid. The tops of the dowels are preferably held in place by dowel connecting strips 35 of a suitable material. The connecting strips are connected to the top of the dowels with pins or nails 36. Adjacent strips and the dowels to which they are secured form parallel lanes L. The projection of the dowels beyond the upper surface of the cast grid permits the top of the cast material be thoroughly worked and due to the quick setstrips. Due to the extreme operating temperatures and the heavy loading of the grid floor in operation, the cast floor must be very dense and uniform throughout. To achieve this type of finished grid requires that the castable material be throughly worked and due to the quick setting time of the castable material, hand compaction is unsatisfactory. Provision must be made for the use of electrically or pneumatically driven vibrators. To provide for the use of such vibrators, the air holes are arranged in a pattern as illustrated in FIGURE 2 so that when the dowels are positioned over the holes and the connecting strips 35 are connected to the top of the dowels, the connecting strips will be aligned to leave lanes L through which the vibrating tool may be made to travel through the castable material as it is being placed in the form and compacted. The placing of the air holes therefore becomes quite crucial.

The dowels are first positioned in each of form sections A in the manner just described. One or more of the sections A are filled at a given time to within approximately one-half inch of the top of the forms with a high temperature castable in a matter of eight to ten minutes. The castable is then compacted by the use of electric or pneumatic vibrators operating freely in the lanes L between the connecting strips 35. When all sections A have been cast, the castable is allowed to harden, approximately eight to twelve hours and then the radial partition members 1 are removed. Dowels are then placed in each section B in the same manner as employed for sections A. High temperature castable is now placed in sections B directly against the hardened castable in sections A, compacted and allowed to harden for the prescribed length of time.

After the castable in all sections B has hardened, the inner ring 20 is removed and partition form members 2 and 3 are installed in the arrangement shown in FIGURE 1 thus dividing the remaining space into form sections A', B' and C. Horizontal strips 5 may also be secured to form members 2 and 3 for creating grooves 7 in the cast sections A', B' and C similar to those in sections A and B. Dowels are then placed in sections A' in the manner previously described and sections A' are filled with high temperature castable directly against the previously hardened castable in sections A and B and allowed to harden in the previously described manner. Dowels are then placed in sections B' and high temperature castable is placed in sections B' directly against the castable in sections A, B and A'. After the castable in section B' has hardened, partition members 2 and 3 are removed and dowels are installed in section C. High temperature castable is placed in section C directly against the hardened castable in sections A' and B'.

After all the form sections have been cast and allowed to harden, and the dowel connecting strips 35 have been removed, the outer ring 10 is removed, thus exposing the top of the grid with the dowels projecting therefrom as illustrated in FIGURE 4, clearly showing where each hole is located. Once the castable material has hardened the air hole outlets are slightly countersunk using a Carboloy drill as illustrated in FIGURE 5. The screws 37 which hold the dowels to the bottom form member 30 are removed and the bottom form member is then removed. If the bottom form member is to be reused, it can be taken out in sections, however, the preferred method is to treat the form member as an expandable item and disintegrate it with heat from the plenum chamber.

The grid is now completely cast and after a few days of final hardening, it is subjected to the proper heat treatment to properly cure the grid preparatory to securing it to the treatment chamber. This heat treatment is accomplished by supplying heated air to the plenum chamber underneath the grid which discharges upward through the holes in the dowels, thereby drying the dowels and when the air temperature reaches the ignition or melting point of the dowels, they burn or melt leaving clean holes through the grid.

FIGURE 6 illustrates the manner in which the grid-plenum assembly 100 is jacked upward into engagement with the treatment chamber 90. The grid projects into the interior of the treatment chamber and the grid-plenum assembly is secured thereto with a suitable connection between the connecting flange 61 and the treatment chamber walls.

I claim:
1. The method of making a high temperature refractory grid, having a plurality of properly positioned air holes extending therethrough, for use as the floor of a fluidized solids reactor comprising the steps of:
    (a) positioning a form comprising a circular ring and a curved plate, in the form of a section of a sphere, said curved plate having a plurality of holes therein, underneath a treatment chamber of a fluidized solids reactor,
    (b) placing partition members within the confines of the ring and in contact with the curved plate to divide the area of said plate into a plurality of sections,
    (c) vertically positioning a combustible dowel, having a channel extending longitudinally therethrough, over each hole in said curved plate and fastening said dowel to said plate with fastening means passing through the hole in said plate and into the end of said dowel,
    (d) pouring a high temperature refractory castable material into alternate sections to a depth less than the length of said dowels and vibrating said castable material,
    (e) allowing said castable material to harden and then removing the partition members,
    (f) pouring said refractory castable material into the remaining sections directly against the already hardened refractory material in the sections mentioned in step (d) and vibrating said refractory castable material,
    (g) allowing said castable material to harden and removing the fastening means securing said dowels to said curved plate,
    (h) supplying heated air to a chamber beneath said refractory grid and allowing said heated air to pass upwardly through the holes in the dowels, said air being at sufficient temperature to remove said dowels by combustion and to cure said refractory grid.
2. The method of claim 1 comprising the additional step of fastening elongated connecting strips along the top of the dowels with fastening means, said dowels and connecting strips being positioned in a prearranged pattern to form parallel lanes between adjacent rows of dowels and their associated connecting strips.
3. The method of claim 1 comprising the additional step of removing the curved plate from beneath the hardened refractory grid following step (g) and prior to step (h).
4. The method of claim 1 wherein said dowels are meltable at or below the temperature of the heated air of step (h), there being a channel extending longitudinally into each dowel to receive the fastening means for holding the dowels against the curved plate, and the heated air supplied in step (h) is at sufficient temperature to cause said dowels to melt and drain out of the refractory grid and to cure said refractory grid.
5. The method of claim 4 comprising the additional step of fastening elongated connecting strips along the top of the dowels with fastening means, said dowels and connecting strips being positioned in a prearranged pattern to form parallel lanes between adjacent rows of dowels and their associated connecting strips.
6. The method of claim 4 comprising the additional step of removing the curved plate from beneath the hardened refractory grid after removing the fastening means holding the dowels against the curved plate and prior to supplying heated air to the chamber beneath the refractory grid.

References Cited
UNITED STATES PATENTS

| | | | |
|---|---|---|---|
| 995,914 | 6/1911 | Sanford | 264—59 |
| 1,334,871 | 3/1920 | Luten | 264—32 |
| 1,341,077 | 5/1920 | Schaefer | 264—30 |
| 2,366,475 | 6/1942 | Bartholomew | 22—149 |
| 2,388,701 | 11/1945 | Neff | 25—131.5 |
| 2,506,244 | 5/1950 | Stopka | 25—156 |
| 2,798,279 | 7/1957 | Thomas | 25—118 |
| 2,867,886 | 1/1959 | Benson | 25—118 |
| 3,127,459 | 3/1964 | Bratton | 264—154 |
| 3,345,160 | 10/1967 | Miccioli | 75—222 |

OTHER REFERENCES

Harbison Walker Refractories Co., "Modern Refractory Practice," 1961, pp. 44, 154, 163, 250.

JULIUS FROME, Primary Examiner

J. H. MILLER, Assistant Examiner

U.S. Cl. X.R.

25—152; 110—74; 264—32, 34, 59

UNITED STATES PATENT OFFICE
CERTIFICATE OF CORRECTION

Patent No. 3,467,738          Dated September 16, 1969

Inventor(s)     ROBERT PYZEL

It is certified that error appears in the above-identified patent and that said Letters Patent are hereby corrected as shown below:

Column 1, line 33, "in to" should be --into--;

Column 4, line 28, "be thoroughly worked and due to the quick set-" should read --to be troweled smooth underneath the connecting--;

Column 5, line 11, "expandable" should be --expendable--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents

FORM PO-1050 (10-69)